United States Patent

Townsley

[15] 3,639,043
[45] Feb. 1, 1972

[54] AN ADJUSTABLE HOUSING FOR APPARATUS FOR DETERMINING CORNEA CONTOUR

[72] Inventor: Malcolm G. Townsley, Park Ridge, Ill.
[73] Assignee: The Plastic Contact Lens Company, Chicago, Ill.
[22] Filed: Sept. 24, 1970
[21] Appl. No.: 75,131

Related U.S. Application Data

[63] Division of Ser. No. 778,965, Nov. 26, 1968.
[52] U.S. Cl. ................................. 351/38, 248/179, 269/60
[51] Int. Cl. ..................................... A61b 3/00, F16l 11/12
[58] Field of Search .................. 351/38; 269/60; 248/11, 23, 248/179

[56] References Cited

UNITED STATES PATENTS 3,463,579   8/1969   Papritz ..................................... 351/38

Primary Examiner—David Schonberg
Assistant Examiner—Paul A. Sacher
Attorney—McDougall, Hersh, Scott & Ladd

[57] ABSTRACT

An apparatus for determining the contour of the human cornea comprising a substantially opaque target having a plurality of light-transmitting gaps through which light beams can be projected onto the eye of a patient. The pattern of light beams reflected in the eye can then be photographed with the particular configuration providing a basis for determining mathematically the contour of the eye. The target structure comprises a pair of hollow plastic shells provided with an opaque coating. The coating is removed in selected areas to provide the light transmitting gaps. The shells are mounted at one end of an adjustable housing, and a camera and through-the-lens focusing means are located at the opposite end of the housing. The adjusting means comprise double joint ball and socket means which permit the operator to make finite adjustments for accurate alignment while viewing the eye.

4 Claims, 15 Drawing Figures

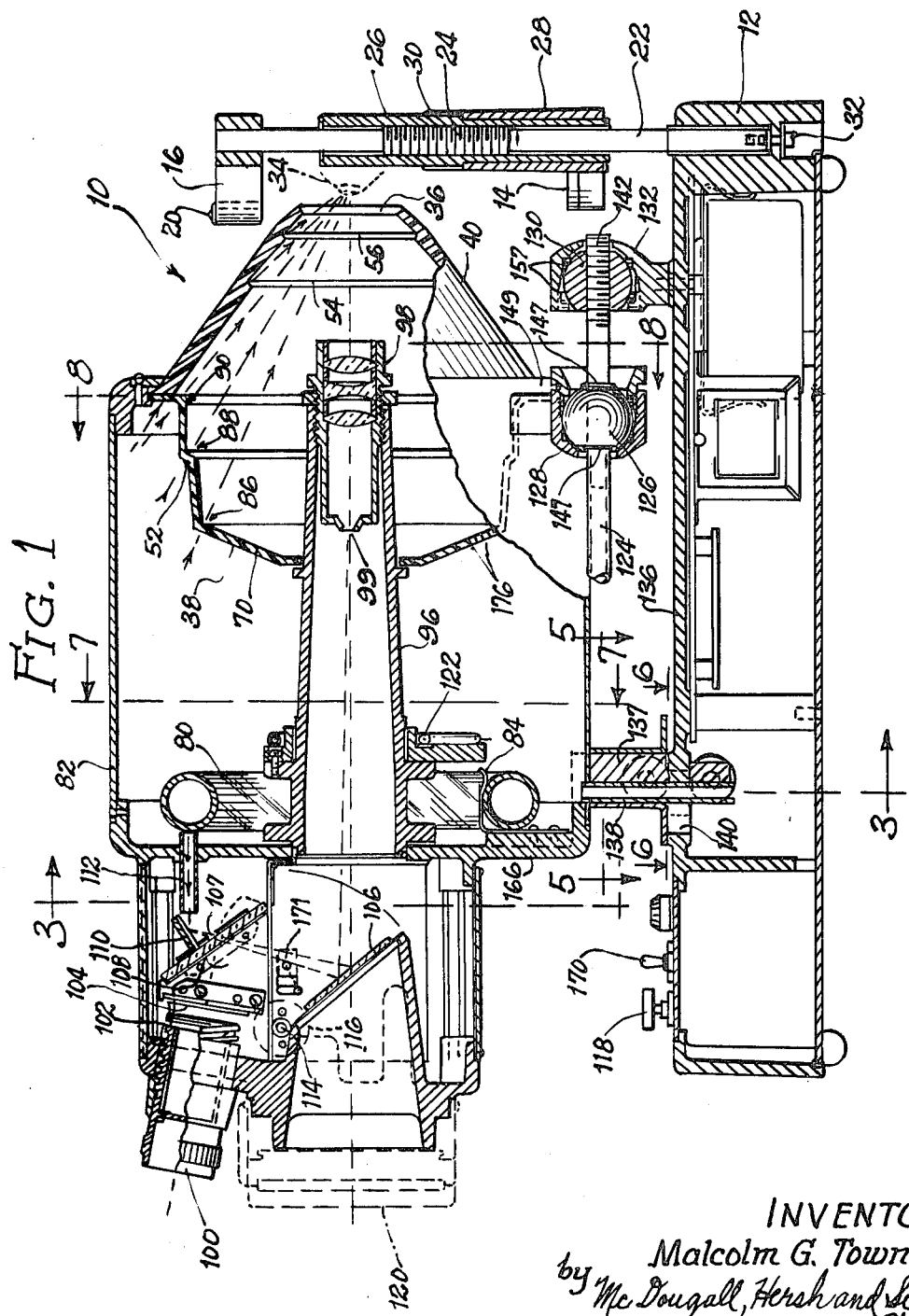

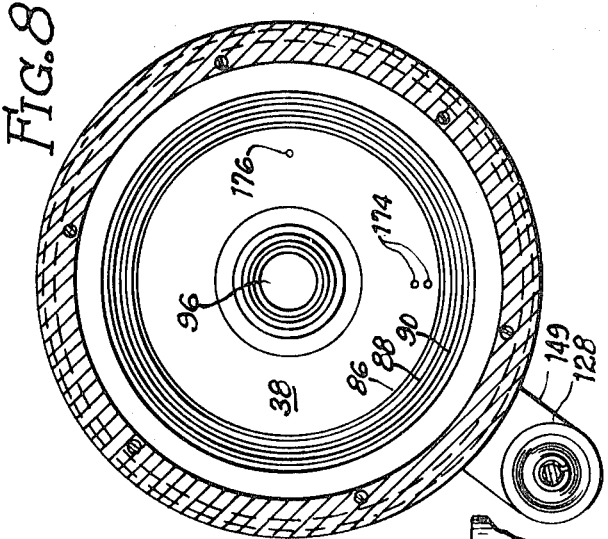
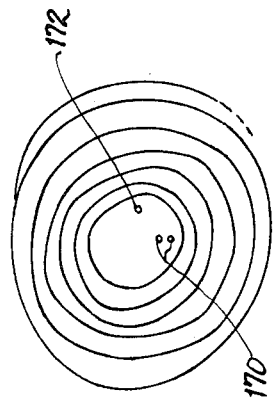
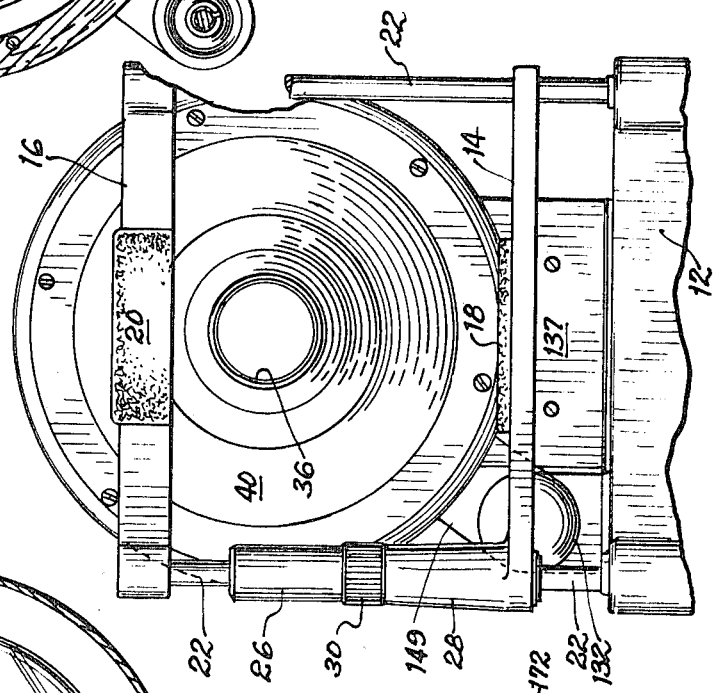
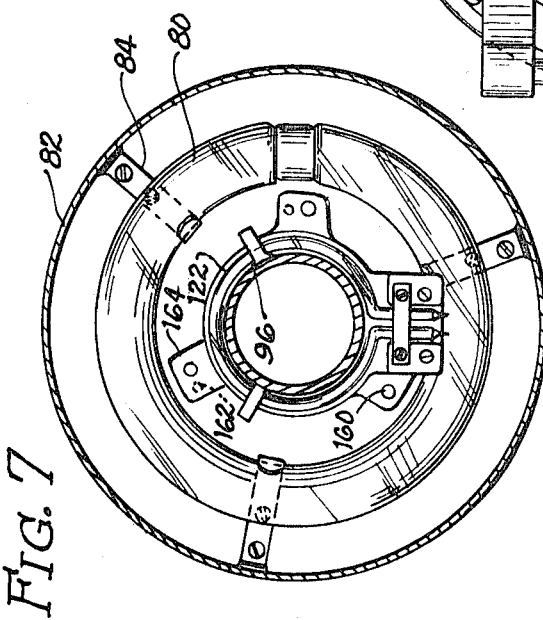
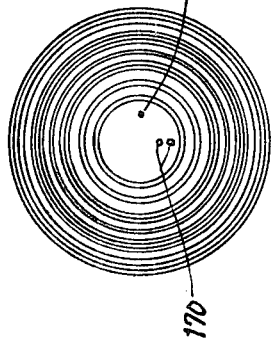

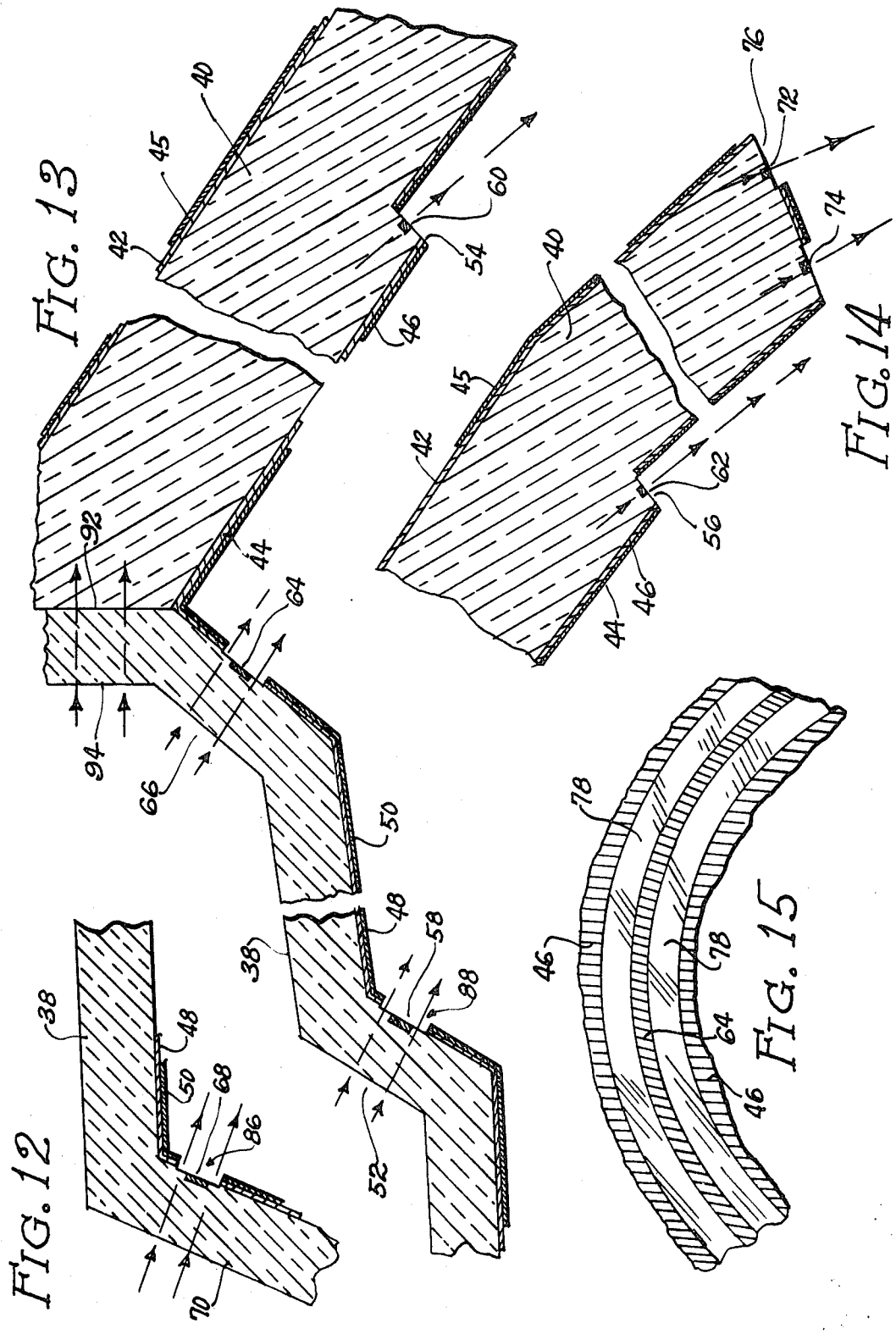

AN ADJUSTABLE HOUSING FOR APPARATUS FOR DETERMINING CORNEA CONTOUR

This is a division of my copending application Ser. No. 778,965, filed Nov. 26, 1969.

This invention relates to an apparatus designed for determining the contour of the human cornea. The primary use of the apparatus relates to the fitting of contact lenses. Thus, the corneas of each individual will vary in contour, and measurements of the contour must be made to provide an appropriate design for a contact lens.

Many instruments have previously been designed for purposes of measuring the shape of the human cornea. These instruments include both visual and photographic systems for recording the data from which the analysis of the corneal shape is to be derived, and several methods have been described for analyzing the information obtained from visual examination or photographic recording to determine by suitable mathematical manipulation of the data, the shape of the cornea.

It is a general object of this invention to provide an improved apparatus for the preparation of photographs of the human cornea whereby mathematical exercises can be undertaken for purposes of determining the contour of the cornea.

It is a more specific object of this invention to provide an apparatus of the type described which is capable of providing highly accurate photographs thereby simplifying mathematical computations and which is characterized by a highly efficient and easily handled operating procedure.

These and other objects of this invention will appear hereinafter and for purposes of illustration but not of limitation, the specific embodiments of the invention are shown in the accompanying drawings in which:

FIG. 1 is a side elevational view, partly in section, illustrating the apparatus of the invention;

FIG. 7 is a vertical, sectional view taken about the line 7—7 of FIG. 1;

FIG. 8 is a vertical, sectional view taken about the line 8—8 of FIG. 1;

FIG. 9 is an elevational view of the opposite end of the apparatus;

FIG. 10 is a detailed view of the light pattern developed by the target on a perfect sphere;

FIG. 11 is a detailed view of the light pattern developed by the target on an eye having an irregular contour;

FIGS. 12, 13 and 14 are enlarged fragmentary, sectional views of portions of the target; and, FIG. 15 is an enlarged fragmentary view illustrating the configurations of the transparent gap formed in the target.

Figure 3:
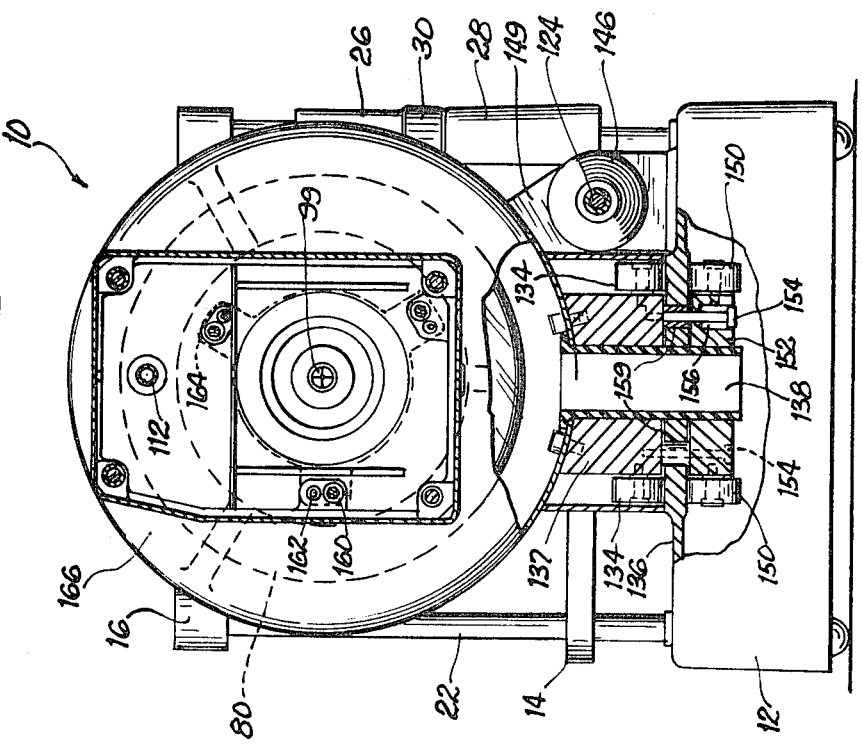
FIG. 3 is a vertical sectional view taken about the line 3—3 of FIG. 1.
Figure 2:
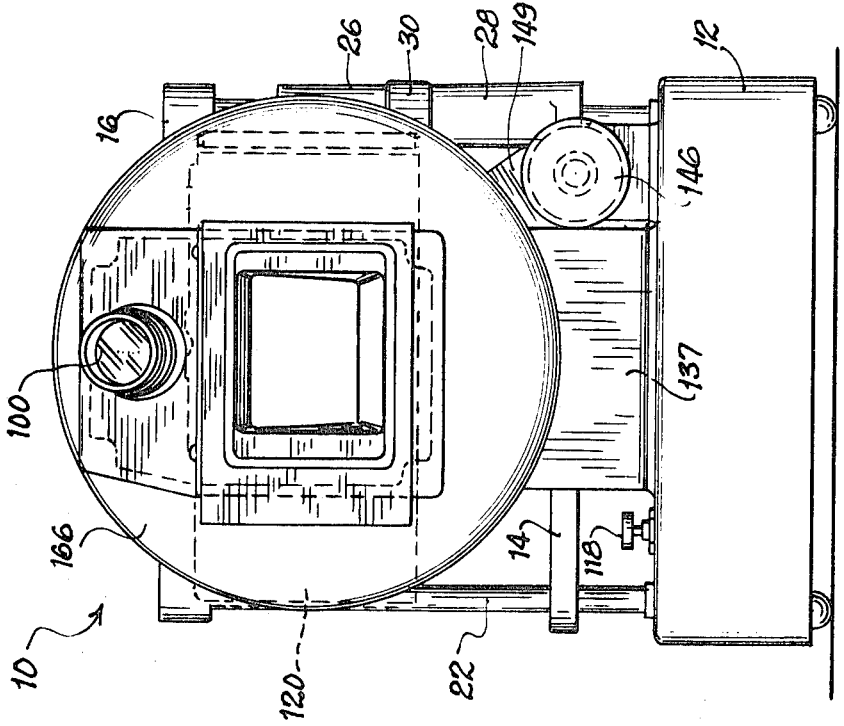
FIG. 2 is an end elevational view of the apparatus.

The apparatus of this invention generally comprises an illustrated target designed to develop a light pattern on the eye surface. A camera is positioned in line with the reflected light from the eye for providing a photographic record of the light pattern.

The improvements of the invention relate to certain structural elements including the target structure. The target is formed from a pair of hollow plastic shells with one of the shells being conically shaped and defining an opening at its narrow end portion.

The target shells are covered with an opaque material except in areas, preferably circular, which comprise gaps in the opaque material. A light source is provided behind the target so that a definite light pattern is transmitted through the target and reflected from the surface of the eye forming a virtual image behind the corneal surface. The construction is designed so that a known pattern will be formed on a perfectly spherical element. By means of mathematical calculations, the pattern developed on the human eye can be compared with the spherical pattern to determine the location and extent of variations from a perfect sphere. Suitable mathematical procedures are described in an article by the inventor entitled "New Equipment and Methods for Determining the Contour of the Human Cornea" appearing in Contacto, Volume 11, No. 4, Dec. 1967 issue, at page 72. In addition to the mathematical discussion, this article discloses background material relative to the subject matter of this invention along with many of the features disclosed and claimed herein.

The apparatus of the invention is provided with a through-the-lens focusing arrangements so that the operator will have a precise idea of the nature of the photograph which will be achieved and can bring the image into sharp focus and proper centering by observation of the viewing screen. The target and camera are mounted on an adjustable housing with the controls being such that finite adjustments can be made to insure accurate alignment. The adjustment of the system is facilitated through the use of a light tube and mirror combination which insures that the line of sight will be in accurate alignment with the camera lens.

FIGS. 1 through 4 and 9 illustrate a measuring apparatus 10 characterized by the features of this invention. The apparatus includes a supporting base 12 which also serves as a housing for some operating elements to be described.

A head rest construction is provided at one end of the apparatus. This construction includes a horizontally disposed chin rest 14 and a forehead rest 16. The pads 18 and 20 indicate the specific area for positioning of the head during a measuring operation.

The head rest arrangement is supported by means of a pair of posts 22 extending upwardly from the base 12. One of the posts is provided with an intermediate threaded section 24 having a rotatable adjusting cylinder 26 associated therewith. The adjusting cylinder carries a supporting cylinder 28 with the bar 14 being integrally formed with this supporting cylinder. The bar 14 defines an opening at its opposite end for receiving the other post 22. A knurled portion 30 is formed on the cylinder 26, and rotation of this cylinder will provide for raising and lowering of the chin rest bar. The lower ends of the posts 22 are supported in bores defined by the base 12.

When the head of a patient is positioned on the rest, adjustments are made to position the eye 34 centrally of the opening 36 defined by the target. This target consists of a pair of shells 38 and 40.

Each of these shells is formed of transparent material. Shell 38 must reflect a large portion of the light falling on it into the interior of the cavity formed by housing 82 and shell 38. This can be accomplished by coating the interior with an opaque white paint of high reflectance or with evaporated aluminum as shown at 48. A black enamel coating 50 may be applied over the reflective coating 48.

The surfaces of shell 40 must also reflect the light falling on them, but in the case of shell 40, the light enters the body of the plastic material through the edge at 94, so that the polished surface of the plastic shell 40 is, of itself highly reflective for light which is within the shell material, and any coating may be dispensed with. Alternatively, both the inner and outer surfaces of shell 40 may be coated with an evaporated coating of aluminum 42 and 44. A black enamel 46 may be applied over the coating 44, and a decorative enamel of any desired color 45, may be applied over the outer surface coating 42. These surfaces define an irregular configuration in order to provide properly located illuminated target areas. In the case of the shell 38, the sidewall of the shell is stepped at 52. The shell 40 is in the shape of a cone with wall portions being machined away to provide steps 54 and 56. A groove 58 is cut into the step 52, and grooves 60 and 62 are formed in the steps 54 and 56.

An additional groove 64 is formed on the inner face of the angularly disposed portion 66 adjacent the outer end of the shell 38. Another groove 68 is formed in the top wall 70 of the shell 38 adjacent the juncture with the sidewall. Finally, a pair of grooves 72 and 74 are cut into the edge 76 at the narrow end of the shell 40. All of the grooves mentioned are provided in the shells prior to the application of the coatings.

Once the coatings have been applied, means are provided for removing portions of the coatings in the areas of the several grooves so that gaps for light transmission may be provided. The shells could, for example, be placed on a lathe and the coatings machined away.

When the coatings 44, 46, 48 and 50 are initially applied, they will fill the grooves and subsequent machining will leave the coatings in the grooves. Accordingly, an arrangement such as shown in FIG. 15 will be provided wherein the groove 64 will be filled with an opaque material while annular gaps 78 will be provided on either side of the groove. This same general relationship will be provided in each instance since an opaque line will be located in the area of the grooves with openings for light transmission located on either side of the line.

A fluorescent light 80 is located within the cylindrical housing portion 82 of the construction. Suitable clips 84 are provided to permit easy replacement of the fluorescent bulb. As best shown in FIG. 1, light from the bulb will be directed to the backside of the shell 38 for passage through the shell in the areas 86, 88 and 90, these areas being located at the positions of the grooves 68, 58 and 64, respectively.

The illumination from the fluorescent light will also be passed into the edge 92 of the shell 40, this edge abutting the outer flange 94 of the shell 38. Because of the outer coating 42 and the inner coatings 44 and 46, the shell 40 acts as a light pipe. The light will be transmitted through the body of the shell and out through the gaps provided in the area of the steps 54 and 56 and also through the edge 36 of the shell.

The fluorescent light 80 is positioned in surrounding relationship relative to an elongated tubular lens holder 96. A threaded member 98 is provided at the end of the holder, and this threaded member carries actual lens means.

An eyepiece 100 is provided for the operation. The eyepiece comprises a rotatable tubular member provided with screw threads 102 whereby the lens can be adjusted to suit the operator so that the light pattern reflected in the eye can be viewed on the split Fresnel screen 104. In accordance with conventional practice, this arrangement provides a horizontal offset of the image to insure proper focusing on the screen. The image reflected from the eye can be viewed by the provision of a first mirror 106 which directs the light onto a second mirror 108 which in turn directs the light onto the screen 104.

The mirror 108 is provided with an outwardly extending mirror 110 on its back surface, and a light tube 112 directs light from the lamp 80 to the mirror 110. This beam of light is then passed through a hole 107 in the reflecting surface of the mirror 108 and is reflected off the mirror 106 through the lens 98 into the eye. The patient then sees a small spot which is employed to give a fixation point for the patient during adjustment and exposure. The lens can be centered on the eye, through use of adjustment means to be described, by means of an autocollimation technique. Specifically, the opening 107 in the mirror through which the light passing from the light tube 112 passes through the mirror 108, will appear as a shadow when viewed against a background of general illumination provided by the light from the target. The light passing through the hole 107 in the mirror is imaged in the cornea by the lens 98, and the light is returned to the lens 98 by reflection from the cornea. When the axis of the lens 98 is normal to the surface of the cornea at the point where the image is formed, the light is returned to the lens and the image of the opening 107 in the mirror 106 is returned to coincide with the opening 107, and the operator can see this bright image superimposed on the shadow formed on the focusing screen 104 by the opening 107 as described above, and by bringing the image into coincidence with the shadow, can insure that the axis of the lens if normal to the corneal surface at the point where the image of the hole 107 is formed on the corneal surface.

There is provided behind the lens 98 at a distance equal to the focal length of the lens, a cross-wire 99. The light passing from the opening 107 in mirror 108 furnishes illumination by which the patient can see the image of this cross wire formed substantially at an infinite distance, thereby facilitating his ability to align his visual axis with the optical axis of the instrument.

The provision of the illuminated dot is also of value in the initial alignment of the instrument during centering of the lens within the target. To accomplish this initial alignment, a polished steel ball of a known diameter is mounted in the approximate position occupied by a patient's eye. With the ball in place, the lens is adjusted to bring the illuminating spot into coincidence with the "pupil" reflection from the ball.

The mirror 106 is pivotally mounted on shaft 114, and a rotary solenoid 116 is tied to this shaft. This solenoid is connected for energization when the pushbutton 118 is depressed by the operator for purposes of securing a photographic record of the light pattern on the eye. The solenoid operation to swing the mirror 106 upwardly whereby light reflected from the eye will be passed directly to the camera 120. This camera may comprise a modified Polaroid land camera provided with a shutter which will open upon depression of the pushbutton. An electronic flash tube 122 is secured in surrounding relationship relative to the tubular member 96, and this tube is adapted to be flashed by a switch 171 which is closed by the mirror 106 when it reaches the upper limit of its swing. Depression of the pushbutton may also operate to turnoff the lamp 80 during operation of the flash tube.

The tubular housing portion 82 is connected to a double socket comprising a threaded rod 124, a ball 126 and socket 128, and a second ball 130 and socket 132.

A rear support 137 is connected to the tubular housing 82. This support carries rollers 134 which normally ride on the upper surface of the top wall 136 defined by the base 12. A downwardly extending tubular element 138 is received in an opening defined by the support 137, and a slot 140 is defined by the top wall 136 to permit some freedom of movement for the member 138.

The rod 124 extends to an adjusting knob 146. The ball 130 is internally threaded and the rod 124 is externally threaded to enable movement of the target structure for the distance permitted by the slot 140. The rod 124 is fixed in position relative to the ball 126 by means of clips 147 and the target structure moves with the rod due to the connection between the socket 128 and extension 149 of the target.

An additional set of rollers 150 is supported on a lower carriage 152. These additional rollers ride against the under surface of the top wall 136. A pair of pins 154 are received in bores defined by the lower carriage 152 and the threaded upper ends of these pins are received by the support 137. Springs 156 are interposed between the heads of the pins and the seat of the bores to permit movement of the pins 154 relative to the wall 136. In the position of the structure shown in FIG. 3, the pins are in their lowermost position. When the rod 124 is pivoted by movement of the knob 146, the entire assembly can be pivoted about the location determined by the rollers 150 and 134 and the wall 136 of base 12, to bring the opening 34 into the desired relationship with the eye of the patient to secure autocollimation as hereinbefore described. Rotation of the knob 146 advances and retracts the entire housing to and from the patient's eye to achieve proper focusing adjustment and also described. A packing material 157 is interposed between the ball 130 and the socket 132 to provide strong frictional engagement so that the assembly can be maintained in this position until the operator again wishes to move the assembly.

Additional pairs of rollers 159 are located between the support 137 and the lower carriage 152. These rollers are confined in slots 161 defined by the wall 136, and the rollers serve to maintain alignment of the carriage assembly.

Figure 4:
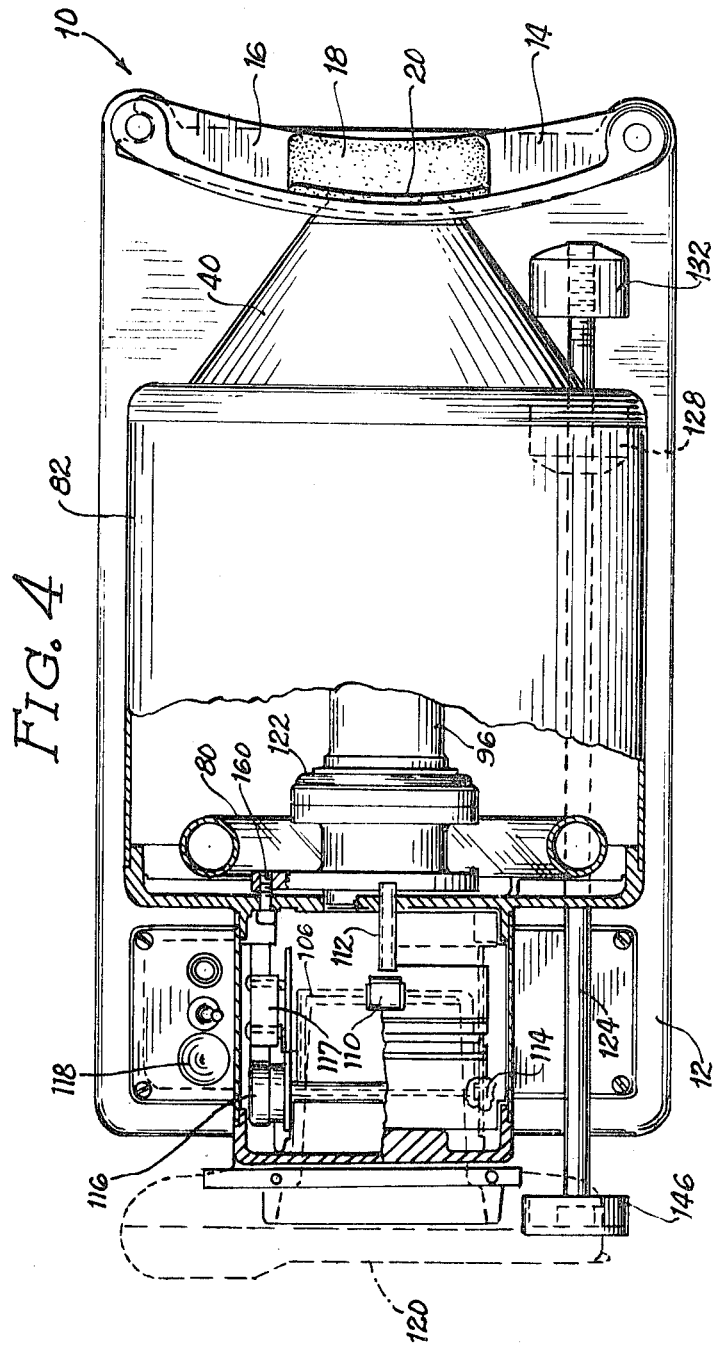
FIG. 4 is a plan view, partly cut away, of the construction.
Figure 6:
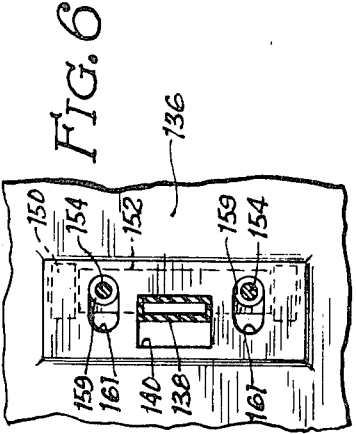
FIG. 6 is a detailed, sectional view taken about the line 6—6 of FIG. 1.
Figure 5:
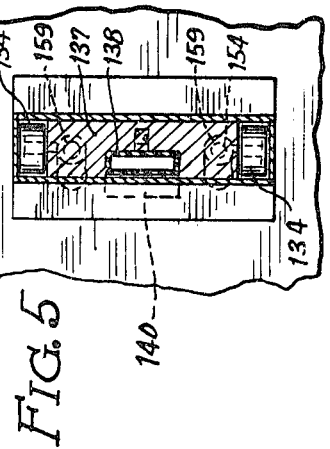
FIG. 5 is a detailed, sectional view taken about the line 5—5 of FIG. 1.

Means are also provided for accurate positioning of the lens holder 96 relative to the camera and relative to the target opening 36. These means include three-clamp screws 160 and three-adjacent setscrews 162 located on cars 164 located at the end of the member 96. As shown in FIG. 4, the clamp screw 160 can be rotated to vary the distance between the tubular member and the backwall 166 of the housing 82. The associated setscrews are tightened against the cars 164 when the desired relationship is achieved. The three-position adjustment permits accurate axial alignment in the construction.

Appropriate wire leads may extend from within the base 12 through the tubular member 138 which serves as a wire guide. Connections to the solenoid 116, lamp 80 and electronic flash tube 122 may thus be provided.

In the operation of the device, the patient places his head in position with his chin on the pad 18 and forehead on the pad 20. A switch button 170 is provided for turning on the light, and the operator can then look through the eyepiece 100 and see an image of the target pattern on the screen 104. The spot provided by means of the light tube 112 and mirror 110 is then centered relative to the eye by adjusting the position of the assembly with the handle 146. Focusing on the screen is also achieved by rotation of this handle. When the centering and focusing operations are completed, the pushbutton 118 is depressed. Any suitable switch may be actuated by the pushbutton to cutoff current to the lamp 80 and to energize the solenoid 116 and the flash tube 122 with time delay means being provided to delay the last operation. A time delay between energization of the solenoid and actuation of the flash also can be provided by including a switch 171 which will be actuated by the mirror 106 to avoid the possibility of the mirror interfering with the passage of light to the camera.

FIG. 10 illustrates the preferred light pattern as it would appear on a perfect sphere. It will be noted that a plurality of circular lines are formed, the lines being in pairs due to the provision of the grooves between the light transmitting gaps. FIG. 11 illustrates an exaggerated example of a pattern appearing on a cornea. The bands of light become noncircular thereby illustrating variations from a spherical surface. By measuring the distance from a center point in any direction and by making appropriate mathematical calculations, the degree of variations from a sphere can be determined, and the shape of the cornea accurately computed.

In previous practice, patterns such as shown in FIG. 11 have been used wherein single lines rather than double lines appear. The target structure of this invention provides distinct lines due to the presence of the grooves between adjacent light transmitting gaps. By providing the narrow opaque area between the gaps, there is a tendency to prevent aberrations of the light. Thus, sharper lines are provided on the photographic reproduction with this arrangement. The use of a pattern of bright double rings with a dark ring between them has been previously suggested.

As shown in FIG. 4, the light patterns include a pair of spots 170 below the center and a single spot 172 to the right of center. These spots are provided due to the presence of holes 174 and 176 defined by the target shell 38. These small holes are provided so that a person viewing the photograph can immediately orient the photograph relative to the position of the eye. Thus, the two dots will always be on the bottom half of the eye while the single dot will always be on the right side of the eye.

It will be understood that various changes and modifications may be made in the above-described construction which provide the characteristics of this invention without departing from the spirit thereof particularly as defined in the following claims.

I claim:

1. In an apparatus for determining the contour of the human cornea wherein an illuminated target is provided for developing a light pattern on the eye surface and including a camera for providing a photographic record of the pattern, the improvement in means for adjusting the position of the target structure in order to center the light pattern on the eye, said adjusting means comprising an externally threaded rod, means extending from said target structure connecting the structure to the rod, and a ball and socket secured to a supporting base for the target structure, said ball defining a threaded bore receiving the rod means for rotating said rod about its own axis for shifting the target structure longitudinally relative to said base, and a resiliently mounted rear support means extending between said target structure and said base, and further including means allowing for pivotal movement of said target structure about a horizontal axis in response to the application of a vertical force component to the rod.

2. An apparatus in accordance with claim 1 wherein said means connecting the target structure to the rod comprise a second ball and socket, the second ball being secured against movement relative to the rod.

3. An apparatus in accordance with claim 1 further including a first pair of wheels carried by said support and riding on the top surface of said base, a lower carriage means resiliently tied to said rear support means, and a second pair of wheels riding on the underside of said base, said lower carriage and associated wheels yielding relative to said rear support means when a vertical component of force is applied.

4. An apparatus in accordance with claim 3 including guide rollers located between said lower carriage and said rear support means, said guide rollers ride in slots formed in said base.

* * * * *